US009338609B2

(12) United States Patent
Heydlauf (10) Patent No.: US 9,338,609 B2
(45) Date of Patent: May 10, 2016

(54) LOCATION BASED, VIRTUAL NETWORK COMPUTING-SWITCHING SYSTEM

(71) Applicant: Siemens Healthcare Diagnostics Inc., Tarrytown, NY (US)

(72) Inventor: Michael W. Heydlauf, Raleigh, NC (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 14/416,102

(22) PCT Filed: Jul. 24, 2013

(86) PCT No.: PCT/US2013/051794
§ 371 (c)(1),
(2) Date: Jan. 21, 2015

(87) PCT Pub. No.: WO2014/018609
PCT Pub. Date: Jan. 30, 2014

(65) Prior Publication Data
US 2015/0208206 A1 Jul. 23, 2015

Related U.S. Application Data

(60) Provisional application No. 61/675,390, filed on Jul. 25, 2012.

(51) Int. Cl.
*H04M 1/66* (2006.01)
*H04W 4/04* (2009.01)
(Continued)

(52) U.S. Cl.
CPC .............. *H04W 4/04* (2013.01); *H04L 67/025* (2013.01); *H04W 4/023* (2013.01); *H04W 4/043* (2013.01); *H04W 12/06* (2013.01); *H04W 64/00* (2013.01); *H04W 4/008* (2013.01); *H04W 4/02* (2013.01)

(58) Field of Classification Search
CPC ................................ G01S 1/047; G01S 5/0284
USPC .......................................................... 455/411
See application file for complete search history.

(56) References Cited

U.S. PATENT DOCUMENTS

2003/0142016 A1* 7/2003 Pickup .................... G01S 1/047
342/387
2006/0019679 A1 1/2006 Rappaport et al.
(Continued)

FOREIGN PATENT DOCUMENTS

WO 0016336 3/2000

OTHER PUBLICATIONS

International Search Report for PCT/US2013/051794 dated Dec. 30, 2013.

*Primary Examiner* — Thomas Lett (57) ABSTRACT

A system that combines an indoor positioning system (IPS), virtual network computing (VNC), and at least one mobile processing device, e.g., a tablet computer. The IPS determines the location of the mobile processing device, from which information a most proximate instrument, device, and/or system can be determined. Once the most proximate instrument, device, and/or system is determined, the mobile processing device is adapted to launch a remote desktop session with the instrument, device, and/or system via the VNC. Advantageously, the launched remote desktop session automatically authenticates with the software of the instrument, device, and/or system and, moreover, displays data from the instrument, device, and/or system on the at least one mobile processing device in a format with which an operator is most familiar.

22 Claims, 5 Drawing Sheets (51) Int. Cl.
  *H04L 29/08* (2006.01)
  *H04W 12/06* (2009.01)
  *H04W 64/00* (2009.01)
  *H04W 4/02* (2009.01)
  *H04W 4/00* (2009.01)

(56) References Cited

U.S. PATENT DOCUMENTS

| | | | |
|---|---|---|---|
| 2008/0088462 A1 | 4/2008 | Breed | |
| 2008/0126929 A1* | 5/2008 | Bykov | G06F 9/4443 715/700 |
| 2009/0177764 A1 | 7/2009 | Blatherwick et al. | |
| 2011/0009059 A1 | 1/2011 | Camp et al. | |
| 2011/0012743 A1* | 1/2011 | Van Gorp | G08C 17/02 340/686.6 |
| 2011/0162048 A1 | 6/2011 | Bilbrey et al. | |
| 2011/0177831 A1 | 7/2011 | Huang | |
| 2012/0094625 A1* | 4/2012 | Worley | H04W 12/12 455/293 |
| 2012/0171995 A1 | 7/2012 | Krafzik et al. | |
| 2012/0179737 A1 | 7/2012 | Baranov et al. | |
| 2015/0281235 A1* | 10/2015 | D'Argenio | H04L 63/10 726/7 |

\* cited by examiner

LOCATION BASED, VIRTUAL NETWORK COMPUTING-SWITCHING SYSTEM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The number of computers in a laboratory environment continues to proliferate, especially now that systems and devices in the laboratory often include instruments, devices, and/or systems that have an integrated and/or dedicated computer. As advantageous as this condition is, communication between integrated and/or dedicated computers and, for example, hand-held processing devices that are carried around by lab technicians is far from seamless. For example, if a lab technician desires to control or interface with a particular instrument, device or system via the lab technician's mobile processing device rather than via the instrument's, device's or system's computer, he/she must first navigate the customized security and hardware of the particular instrument, device, and/or system, which may involve different passwords, a variety of input devices, e.g., mouse, trackball, keyboard, touch screen, and the like, different display sizes, resolutions, form factors, and so forth. In some instances, all of this also must occur with the lab technician remaining in proximity of the particular instrument or the instrument's computer.

Commercially-available software products, such as Syngo® Lab Process Manager developed by Siemens Healthcare Diagnostics, Inc. of Tarrytown, N.Y., can provide access to multiple computers from a single workstation, which addresses some of these concerns and problems. Problematically, this solution works best while lab technicians are located at the workstation interface and while the working instruments, devices, and/or systems interface with the particular workstation. However, once a lab technician moves away from the workstation—which occurs frequently as lab technicians are needed to be more and more mobile—the problems ensue.

Hence, it would be desirable to combine an indoor positioning system (IPS) with a hand-held processing device, e.g., a tablet computer, iPad, and the like, that accompanies the lab technician as he/she makes his/her rounds, moving between the various instruments, devices, and systems within the laboratory. The IPS would be able to estimate the lab technician's physical location with respect to the instruments, devices, and/or systems within the laboratory. More particularly, the combination would be able to use the lab technician's location relative to one of the instruments, devices, and/or systems to enable the lab technician's hand-held device to automatically launch a remote desktop session with the instrument, device, and/or system with which the lab technicians is most proximate.

BRIEF SUMMARY OF THE INVENTION

A system that combines an indoor positioning system (IPS), virtual network computing (VNC), and at least one mobile processing device, e.g., a tablet computer, is disclosed. The IPS determines the location of the mobile processing device, from which information a most proximate instrument, device, and/or system can be determined. Once the most proximate instrument, device, and/or system is determined, the mobile processing device is adapted to launch a remote desktop session with the instrument, device, and/or system via VNC. Advantageously, the launched remote desktop session automatically authenticates with the software of the instrument, device, and/or system and, moreover, displays data from the instrument, device, and/or system on the mobile processing device in a format with which the lab technician is most familiar.

BRIEF DESCRIPTION OF THE SEVERAL VIEWS OF THE DRAWINGS

Other features and advantages of the invention will be apparent from the following description of the preferred embodiments thereof and from the claims, taken in conjunction with the accompanying drawings, in which:

DETAILED DESCRIPTION OF THE INVENTION

A system of and method for universally controlling at least one instrument, device, and/or system contained within a laboratory is disclosed. The system and method combine an indoor positioning system (IPS) with virtual network computing (VNC) to enable lab technicians equipped with a mobile processing device, e.g., a tablet personal computer, to launch or otherwise initiate a remote desktop session with a discrete instrument, device, and/or system to which the lab technician is most proximate.

Figure 1:
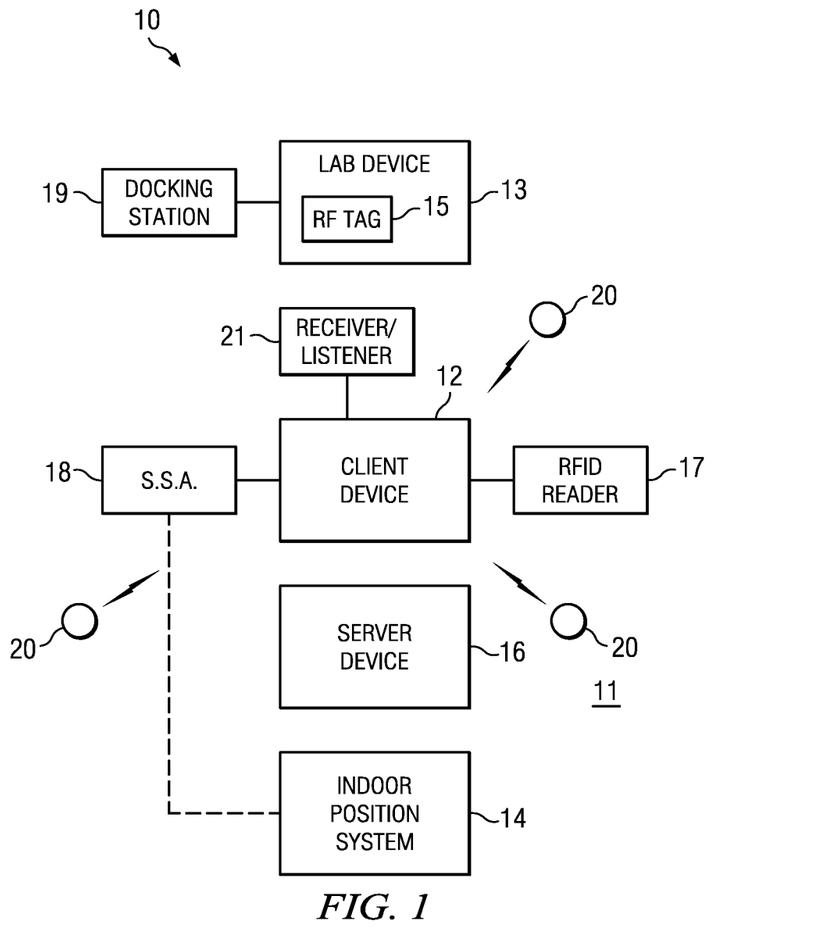
FIG. 1 shows a block diagram of the location-based, virtual network computing-switching system according to the present invention.

Referring to FIG. 1, there is shown a block diagram of an illustrative embodiment of a location-based, VNC-switching system for universally controlling at least one instrument, device, and/or system. The system 10 includes a client device 12, an indoor positioning system (IPS) 14, and a server device 16. The system 10 is adapted to function seamlessly in a laboratory 11 that contains a plurality of instruments, devices, and/or systems (collectively 13) that are disposed at discrete physical locations within the laboratory 11.

The client device 12 is a processing device that includes random access memory, read-only memory, an input/output device(s), a display screen, and a processing unit. Pertinent to this invention, the client device 12 is further hardwired and/or includes a driver program, application, algorithm, computer-executable software, and the like, to launch a remote desktop session with a proximate instrument, device, and/or system 13 via VNC.

The IPS 14 is structured and arranged to identify, determine, or estimate the location of the client device 12 and the lab technician within the laboratory 11 and, more particularly, to identify the client device's 12 location with respect to the various instruments, devices, and/or systems 13 therein. The IPS 14 is further adapted to determine which instrument, device, and/or system 13 the client device 12 is most proximate to. Illustrative, non-exhaustive means by which the IPS 14 identifies, determines or estimates the client device's 12 location can include wireless means, sensor-based means, radio frequency identification (RFID) tagging, and the like.

Wireless-based means include a signal strength analyzer 18 that uses the strength of a received signal, e.g., a WiFi signal, a Bluetooth signal, and the like, to estimate a linear distance between the client device 12 and the server device 16 or other receiving station. Multiple receiving stations, e.g., WiFi routers, Bluetooth dongles, and so forth, enable triangulation to provide a pinpoint location. The wireless-based means, e.g., WiFi, Bluetooth, and the like, for the IPS 14 use built-in wireless connection, adapters, and the like that are integrated into the client device 12.

As an alternative to a wireless-based means, RFID tagging, which is well-known to those of ordinary skill in the art, can be used. Applying RFID technology to the present invention, unique RFID tags 15 can be disposed on or otherwise integrated with a corresponding instrument, device, and/or system 13 while an RFID reader 17 can be incorporated or integrated into the client device 12. The RFID reader 17 is adapted to identify the corresponding RFID tag 15 and, hence, the instrument, device, and/or system 13 associated with that RFID tag 15 which is closest to the client device 12. This also serves to identify the lab technician's location within the laboratory 11. Authentication or "logging on" to the particular instrument, device, and/or system 13 or, more specifically, to the processing device of the particular instrument, device, and/or system 13 occurs automatically once the RFID reader 17 receives the signal from the RFID tag 15.

Optionally or alternatively, a docking station 19 for client devices 12 can be electronically coupled to each of the instruments, devices, and/or systems 13. With a docking option, the lab technician can install his/her client device 12 into the docking station 19, allowing the RFID reader 17 in the client device 12 to read the RFID tag 15, which then initiates a remote desktop session.

Optionally, for reasons of advanced security, the RFID tag 15 for a particular instrument, device, and/or system 13 can be changed after completion of any remote desktop computing, e.g., using a read/write feature in the RFID tag 15. This added security feature can ensure that only client devices 12 actually at or near the instrument, device, and/or system 13 are capable of connecting to the same.

A sensor-based system, e.g., the Cricket Indoor Location System (Cricket) developed at MIT in Cambridge, Mass., can also be used to identify the lab technician's location with respect to a particular instrument, device, and/or system 13. Indeed, Cricket provides location data about the client device 12 to mobile and sensor network applications. These data can include user space, position, and orientation.

Cricket uses active beacons 20 and passive receivers/listeners 21. The active beacons 20 can be attached to the ceiling of the laboratory 11, while passive receivers/listeners 21 can be attached to or integrated into the client device 12. The beacons 20 are structured and arranged to transmit location information, e.g., as an RF message, periodically and also to simultaneously transmit an ultrasonic pulse. The receivers/listeners 21 are adapted to measure distances to nearby beacons 20 using the received RF and ultrasound signals, and, then, to use these distances to compute locations using the difference between the speed of sound (ultrasound) and the speed of light (RF).

There are a myriad of technologies available for conducting remote desktop sessions. For the purpose of illustration and not limitation, the present invention assumes a Remote Framebuffer (RFB) protocol used in conjunction with Virtual Network Computing (VNC). Both standards are well-known to those of ordinary skill in the art and, accordingly, will not be discussed in detail.

Although the system 10 will be described as including both a client device 12 and a server device 16, those of ordinary skill in the art can appreciate that in some applications the functions of the server device 16 (described hereinbelow) could also be performed by the client device 12 and/or by the IPS 14. For example, if the IPS 14 is sensor-based, the client device 12 can be adapted to include the passive receivers/listeners 21, which receive the RF signal and ultrasonic signals emitted by the active beacons 20. Hence, in such an embodiment, the server device 16 is optional.

Figure 2A:
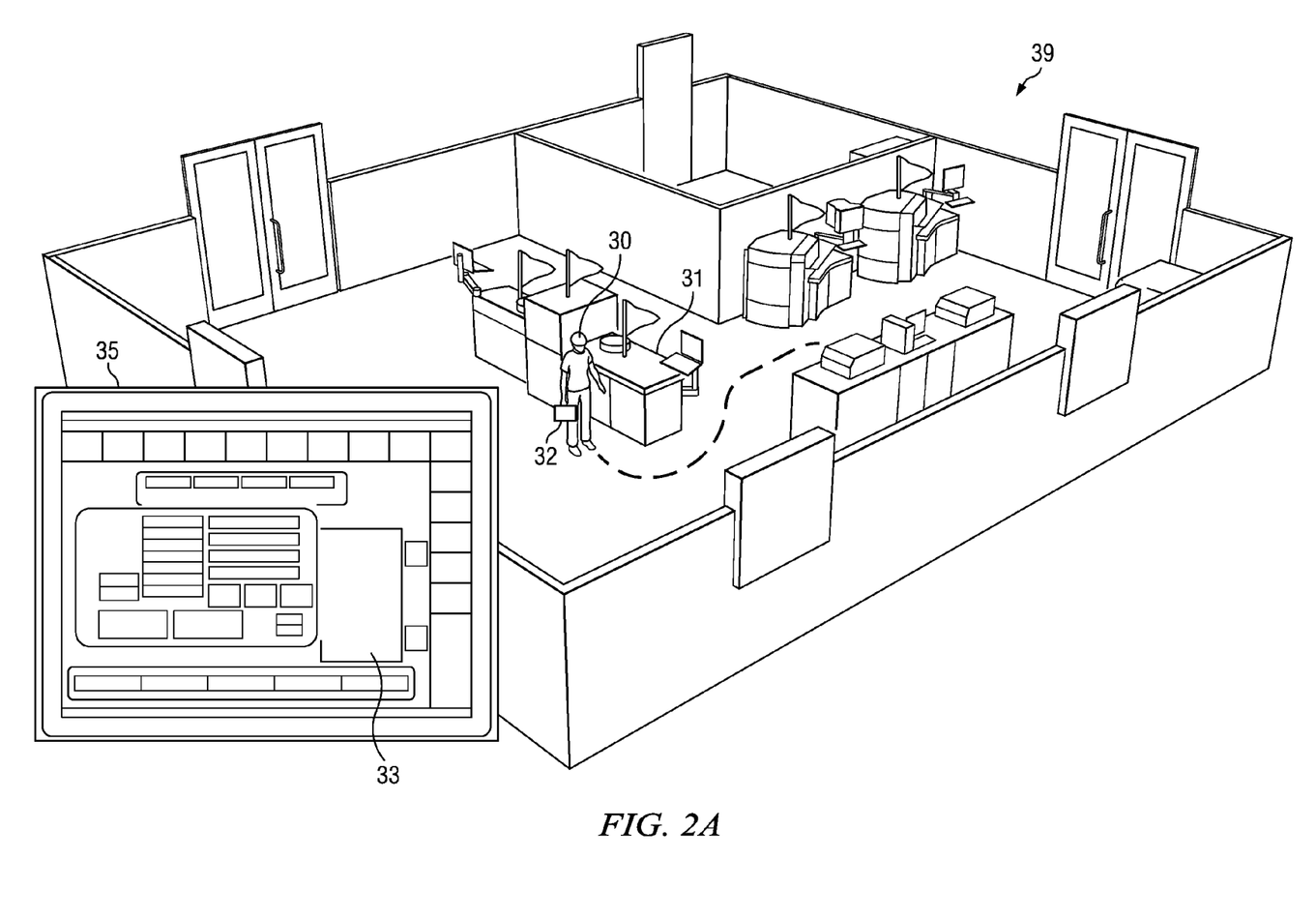
FIGS. 2A-2C show the system of FIG. 1 in use among exemplary instruments, devices, and/or systems within a laboratory.
Figure 2B:
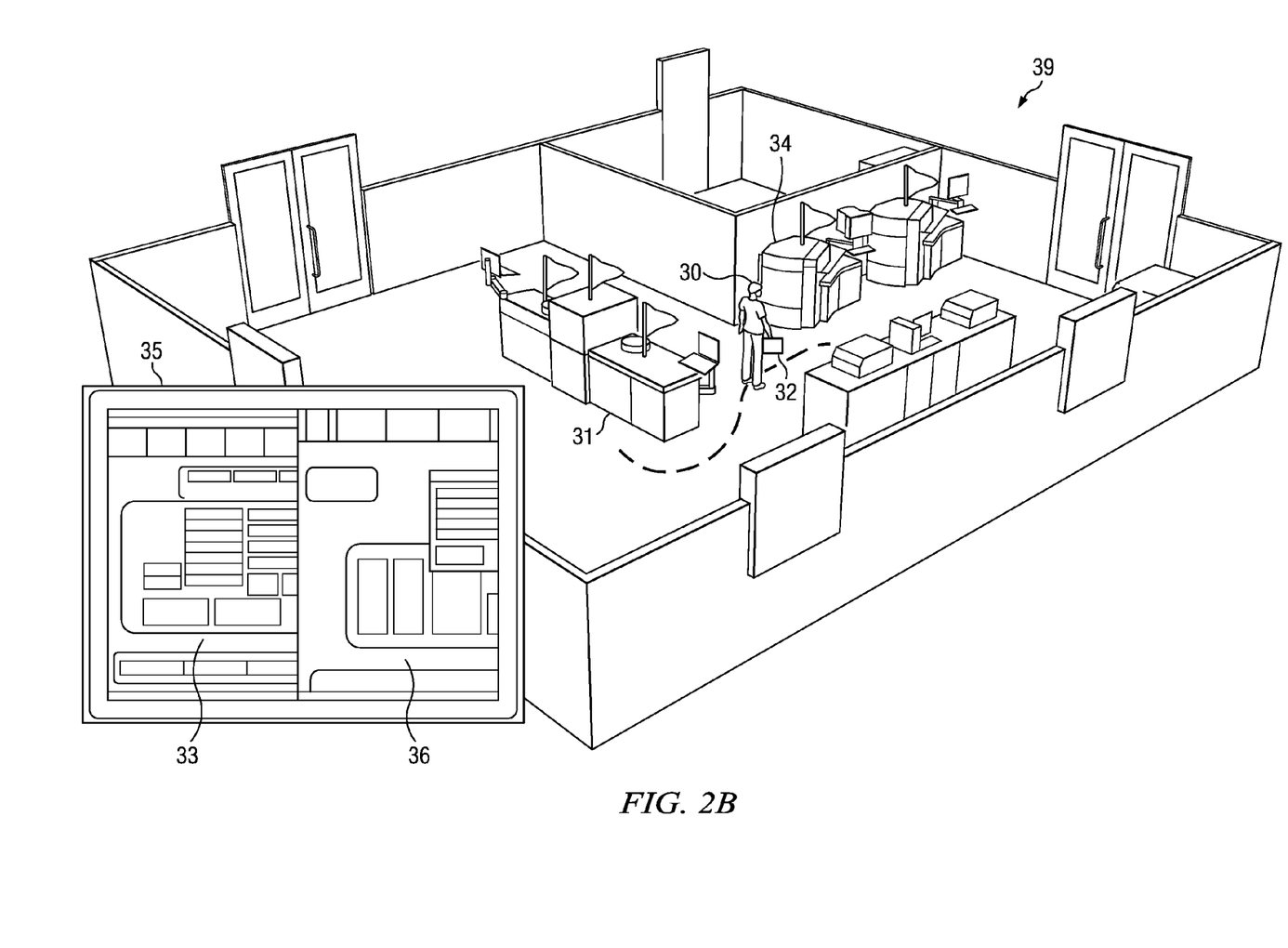
Figure 2C:
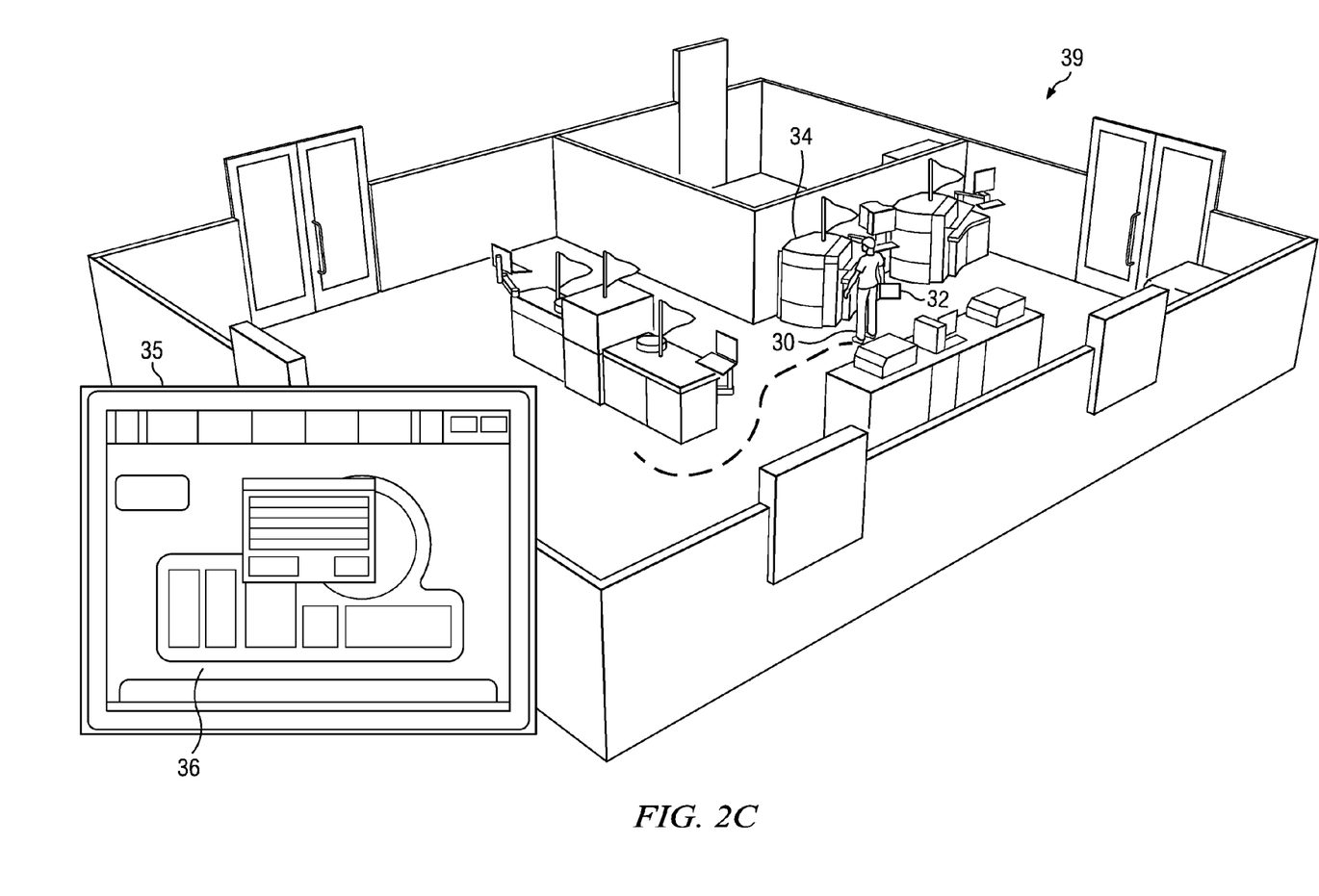
Figure 3:
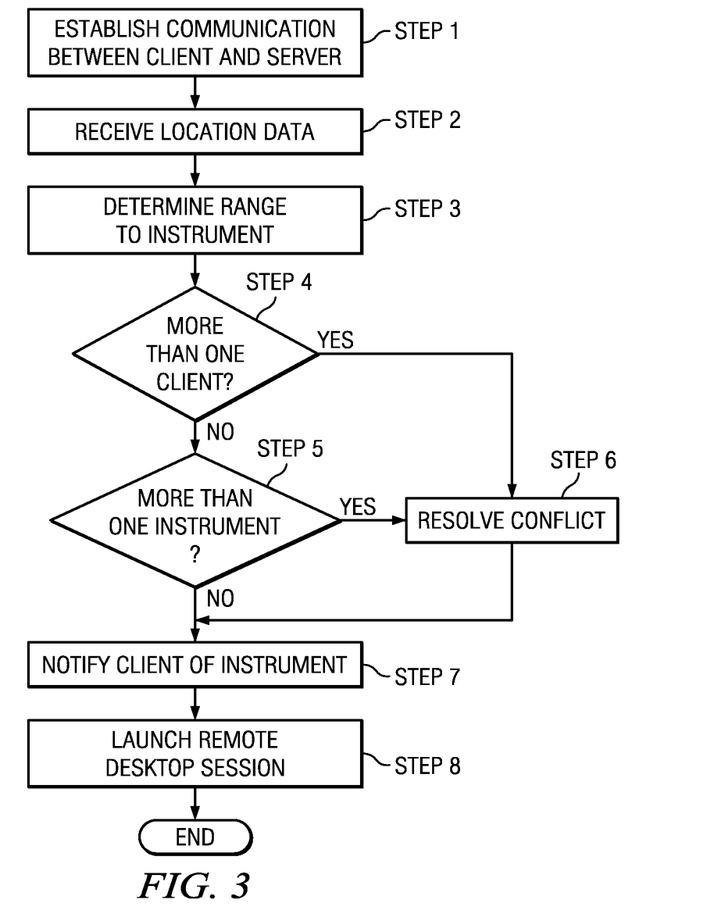
FIG. 3 shows a flow chart of an embodiment of a method of providing seamless, location-based, virtual network computing in accordance with the present invention.

The server device 16 is a processing device having a computer processing unit (CPU), an input/output device(s), read-only memory (ROM), random access memory (RAM). The server device 16 is structured and arranged to provide seamless communication between a client device 12 and a particular instrument, device, and/or system 13 of interest. For ease of discussion, the server device 16 will be described in the context of a method of virtual network switching. FIGS. 2A-2C show various views of a laboratory containing a plurality of instruments, devices, and systems while FIG. 3 shows a flow chart of said method.

In a first step, when a lab technician(s) enters the laboratory environment, communication is established between the client device or a plurality of client devices and a server device (STEP 1). As previously mentioned, establishing communication can be performed wirelessly or a client device can be inserted into a docking station associated with an instrument, device or system that is electronically coupled to the server device.

Once communication is established between the client device(s) and the server device, the client device transmits and the server device receives location data (STEP 2). Location data can originate directly from the client device itself or, alternatively, one or more sensors can transmit location data about the client device to the server device.

The server device is adapted to use the received location data to determine a linear distance from the server device to the client device as well as a distance between the client device and nearby instruments, devices, and systems (STEP 3). More specifically, the server device not only determines a physical distance between the client device and the instruments, devices, and systems but also determines when the client device is within the working range of a specific instrument, device or system. When in the working range of a particular instrument, device or system, the client device is most proximate to that instrument, device or system at the exclusion of all others.

Notwithstanding, because there are a plurality of instruments, devices, and systems in the laboratory environment and because it is likely that there may be more than one client device in the laboratory environment at any given time, the system is structured and arranged to resolve conflicts that may occur between conflicting client devices (STEP 4) and between conflicting instruments, devices, and systems (STEP 5). For example, if two or more client devices are determined to be in range of a common instrument, device or system, and each client device desires to control the common instrument, device or system, the server device must resolve the conflict (STEP 6) by selecting one of the client devices over the other.

For example, when there is a conflict between multiple users, the server device can refer to a conflict resolution user hierarchy protocol or look-up table stored in a memory provided for that purpose. More specifically, the server device can compare the identification of each of the client devices to the user hierarchy protocol to determine which client server has preference over the other(s) for the common instrument, device or system. Once the conflicting client device problem has been resolved (STEP 6), the server device transmits a notification signal to the selected client device, notifying that client device that it can initiate a remote desktop session with the instrument, device or system (STEP 7).

When a client device's location creates a conflict between multiple instruments, devices or systems, i.e., the client device is equally close to two or more instruments, devices or systems, the server device can transmit an inquiry signal to the client device, requesting the lab technician to select which of the two or more instruments, devices or systems the lab technician wants to control or interface with. Alternatively, the server device can refer to a look-up table, which is stored in a memory provided for that purpose, of the client device's historical interaction with the conflicting multiple instruments, devices or systems in question. More specifically, if the historical interaction data shows a significant difference in use of one of the instruments, devices or systems with respect to the other(s), the server device transmits a notification signal to the client device, notifying the client device that it can initiate a remote desktop session with that instrument, device or system (STEP 7). The user of the client device can decline the notification actively or passively by moving closer to the instrument, device or system that he/she desires to control or interface with.

Once a client device has been notified that it can control or interface with a particular instrument, device or system, the client device immediately executes an application, driver program, algorithm, and the like, which is stored in the memory of the client device or on software available thereto, which automatically launches at least one of an authentication sequence and an appropriate remote desktop session (STEP 8) to log on to and to control the particular instrument, device or system. Advantageously, once the remote desktop session is launched, data and control options are displayed on the display screen of the client device in a format that is understood by and most familiar to the lab technician.

Referring to FIG. 2A, a lab technician 30 carrying a mobile client device 32 approaches a first instrument, device or system 31 in the laboratory 39. Once the mobile client device 32 is within the range of the first instrument, device or system 31 and once the server device (not shown) notifies the client device 32 of this condition, the client device 32 automatically authenticates and initiates a remote desktop session with the first instrument, device or system 31.

In the inset of FIG. 2A, an illustrative embodiment of the display device 35 of the client device 32 displays a replica image 33 of the control panel of the first instrument, device or system 31. The lab technician 30 can now interface with the first instrument, device or system 31 using the replica image 33 on the display device 35.

Referring now to FIG. 2B, once the lab technician 30 has commenced controlling the first instrument, device or system 31, he/she can relocate within the laboratory environment while still controlling the first instrument, device or system 31. In FIG. 2B, the lab technician 30 is shown approaching a second instrument, device or system 34. At some point, between the first 31 and second instruments, devices or systems 34, the server device will determine that the client server is equally proximate to the first 31 and to the second instruments, devices or systems 34.

In the inset of FIG. 2B, an illustrative embodiment of the display device 35 of the client device 32 simultaneously displays a replica image 33 of the control panel of the first instrument, device or system 31 and a replica image 36 of the control panel of the second instrument, device or system 34, e.g., as a split screen. The lab technician 30 can choose to maintain the interface with the first instrument, device or system 31, e.g., by touching the left half of the split screen, or to launch a remote desktop session with the second instrument, device or system 34, e.g., by touching the right half of the split screen on the display device 35.

If the latter, which is say, that the lab technician 30 has touched the image of the control panel on the display device 35 corresponding to the second instrument, device or system 34, i.e., the right half, he/she will launch a second remote desktop session, so that, now, he has two sessions on going, which he can go back and forth to. Alternatively, once the lab technician 30 selects the second instrument, device or system 34, and/or the client device 32 becomes more proximate to the second instrument, device or system 34, the client device 32 can automatically deactivate, terminate, end or close the remote desktop session with the first instrument, device or system 31 so that only a remote desktop session with the second instrument, device or system 34 is active on the client device 32. As shown in FIG. 2C, the appropriate replica image 36 of the control panel of the second instrument, device or system 34 is then displayed on the display device 35.

Although preferred embodiments of the invention have been described above, it will be recognized and understood that various modifications may be made in the invention and that the appended claims are intended to cover all such modifications which fall within the spirit and scope of the invention.

What I claim is:

1. A computing system for use in an environment having a plurality of instruments that each have an associated processing system including a processing system display for displaying information pertaining to the respective instrument, the computing system comprising:
   a mobile client device having a mobile client display;
   an indoor positioning system that is operative to determine a location of said mobile client device with respect to the plurality of instruments within a local environment; and
   a server device that is in operational communication with the mobile client device and the indoor positioning system, the server device being operative to:
      determine which one of the plurality of instruments is most proximate to the mobile client device based on the location of the mobile client device with respect to the plurality of instruments;
      select the one of the plurality of instruments that is most proximate to the mobile client device for participation in the remote desktop session with the mobile client device; and
      initiate a remote desktop session between the mobile client device and the selected one of the plurality of instruments to display on the mobile client display, information corresponding to information display on the processing system associated with the selected one of the plurality of instruments.

2. The system as recited in claim 1, wherein the mobile client device is a tablet personal computer.

3. The system as recited in claim 1, wherein the mobile client device includes a radio frequency identification (RFID) reader that is structured and arranged to interface with a unique radio frequency identification (RFID) tag that is integrated into each of the plurality of instruments within the environment.

4. The system as recited in claim 3, wherein the RFID reader is adapted to log a user on to at least one instrument within the environment once the RFID reader has identified said at least one instrument associated with a respective RFID tag.

5. The system as recited in claim 1, wherein the server device includes a signal strength analyzer that is adapted to determine a linear distance to and a location of the mobile client device within the environment.

6. The system as recited in claim 1, wherein the mobile client device includes a passive receiver/listener device to receive radio frequency signals and ultrasound pulses from a plurality of active beacons positioned within the environment.

7. The system as recited in claim 6, wherein the mobile client device is structured and arranged to determine a distance between said mobile client device and each of the plurality of active beacons.

8. The system as recited in claim 7, wherein the mobile client device is structured and arranged to determine a location of said mobile client device using the distance determinations.

9. The computing system of claim 1 wherein functions of the server device and the mobile client device are integrated into a single device.

10. The computing system of claim 1 wherein functions of the server device and the indoor positioning system are integrated into a single device.

11. A computing system for use in a local environment having a plurality of instruments that each have an associated processing system, the system comprising:
 a mobile client device for performing a remote desktop session with the processing system associated with any one of the plurality of instruments within the environment; and
 an indoor positioning system that is adapted to determine a location of the mobile client device and a proximity of said mobile client device to at least two of the plurality of instruments within the local environment,
wherein the mobile client device is structured and arranged to establish the remote desktop session with the processing system associated with a selected one of the of the at least two instruments that is most proximate to the mobile client device.

12. The system as recited in claim 11 further comprising a server device that is in operational communication with the mobile client device and the indoor positioning system and that is adapted to:
 select one of the at least two instruments that is most proximate to the mobile client device; and
 initiate the remote desktop session between the mobile client device and processing system associated with the selected one of the at least two instruments.

13. A method of displaying by a client processing device information associated with one of a plurality of instruments in a local environment, the method comprising:
 receiving signals for determining a position of the client processing device with respect to each of the plurality of instruments, wherein each instrument includes an associated computing system;
 determining, based at least in part upon the received signal, which one of the plurality of instruments is most proximate to the client processing device; selecting the one of the plurality of instruments that is determined to be most proximate to the client processing device for establishment of a remote desktop session with the client processing device;
 launching a desktop session between the client processing device and the selected one of the plurality of instruments; and
 displaying information of the client processing device corresponding to information displayed by the computing system associated with the selected one of the plurality of instruments.

14. The method as recited in claim 13, wherein the receiving step comprising the step of receiving location data signals from the client processing device over a first wireless link and the step of launching a desktop session comprises the step of launching the desktop session over a second wireless link.

15. The method as recited in claim 13, wherein the step of receiving signals from the client processing device includes
 receiving location data signals from the client processing device.

16. The method as recited in claim 13, wherein the step of receiving signals from the client processing device includes the step of performing signal strength analysis to determine a linear distance between between the plurality of instruments and the client processing device.

17. The method as recited in claim 13 further comprising uploading onto said client processing device at least one control and operation program associated with the selected one of the plurality of instruments and retaining the at least one uploaded control and operation program on the client processing device until the user opts to delete said program.

18. The method as recited in claim 13 wherein the step of launching a desktop session includes the step of using the client processing device to authenticate the client processing device or to log on to the selected one of the plurality of instruments.

19. The method as recited in claim 13 wherein the step of selecting one of the plurality of instruments further include the step of selecting one of the plurality of instruments to participate in the remote desktop session in the event that two or more of the plurality of instruments are determined to be most proximate to and equidistant from the client processing device.

20. The method as recited in claim 13 wherein the mobile client device is a first mobile client device and the environment includes a second mobile client device and the first and second mobile client devices are equidistant from and most proximate to one of the plurality of instruments, the method further comprising selecting the first or second mobile client mobile device for initiation of the remote desktop session based upon a predefined conflict resolution protocol.

21. The method of claim 20 further including storing in a memory a predefined selection hierarchy for selecting the first or second mobile client device for initiation of the remote desktop session and the predefined conflict resolution protocol includes selecting the first or second mobile client device for initiation of the remote desktop session based upon the predefined selection heirarchy.

22. The method of claim 13 further including the controlling at least one operation of the selected one of the plurality of instruments from the client processing device via the remote desktop session.

* * * * *